United States Patent
Nakajima et al.

(10) Patent No.: US 10,832,226 B2
(45) Date of Patent: Nov. 10, 2020

(54) SYSTEM AND SERVICE DETERMINATION METHOD

(71) Applicant: RICOH COMPANY, LTD., Tokyo (JP)

(72) Inventors: Tatsuhiko Nakajima, Tokyo (JP); Eiichi Katoh, Kanagawa (JP); Hiroshi Nishida, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 360 days.

(21) Appl. No.: 14/865,951

(22) Filed: Sep. 25, 2015

(65) Prior Publication Data

US 2016/0092848 A1 Mar. 31, 2016

(30) Foreign Application Priority Data

Sep. 30, 2014 (JP) .................................. 2014-201925
Sep. 15, 2015 (JP) .................................. 2015-181829

(51) Int. Cl.
*G06Q 10/00* (2012.01)
*G06Q 30/06* (2012.01)
*G06Q 10/08* (2012.01)
*G06Q 30/02* (2012.01)

(52) U.S. Cl.
CPC ......... *G06Q 10/20* (2013.01); *G06Q 10/0875* (2013.01); *G06Q 30/0283* (2013.01); *G06Q 30/0635* (2013.01)

(58) Field of Classification Search
CPC ....... G06Q 10/087; G06Q 10/06; G06Q 10/20
See application file for complete search history.

(56) References Cited

U.S. PATENT DOCUMENTS

| | | | |
|---|---|---|---|
| 7,313,534 B2 * | 12/2007 | Scheer .................. | G06Q 10/06 705/7.26 |
| 7,865,090 B2 | 1/2011 | Katoh | |
| 2002/0072998 A1 * | 6/2002 | Haines ................. | G06Q 10/087 705/28 |

(Continued)

FOREIGN PATENT DOCUMENTS

JP  4943241  3/2012

OTHER PUBLICATIONS

Lee et al. 'Joint decision making for maintenance and production scheduling of production systems', International Journal of Advanced Manufacturing Technology. May 2013, <http://search.ebscohost.com/login.aspx?direct=true&db=a9h&AN=87016022&site=eds-live&scope=site>. (Year: 2013).*

*Primary Examiner* — Michelle T Kringen
*Assistant Examiner* — Lance Y Cai
(74) *Attorney, Agent, or Firm* — Oblon, McClelland, Maier & Neustadt, L.L.P.

(57) ABSTRACT

A system includes: an apparatus information acquiring unit to acquire, from an apparatus, apparatus information regarding the apparatus; an analysis unit to make an analysis based on the acquired apparatus information; and a service determining unit to determine, on the basis of a result of the analysis, which service of a plurality of services should be provided for the apparatus, the services including a first service of additionally performing maintenance based on the result of the analysis when next other maintenance is performed for the apparatus.

14 Claims, 17 Drawing Sheets

(56) References Cited

U.S. PATENT DOCUMENTS

| | | | |
|---|---|---|---|
| 2003/0036939 A1* | 2/2003 | Flores | G06Q 10/06 |
| | | | 705/7.16 |
| 2003/0214657 A1* | 11/2003 | Stringham | H04L 67/02 |
| | | | 358/1.1 |
| 2005/0074246 A1* | 4/2005 | Hayward | G06Q 30/0605 |
| | | | 399/8 |
| 2006/0036847 A1* | 2/2006 | Bush | H04L 29/12783 |
| | | | 713/153 |
| 2008/0071626 A1* | 3/2008 | Hill | G06Q 10/00 |
| | | | 705/22 |
| 2011/0093157 A1* | 4/2011 | Prabhakaran | G07C 5/006 |
| | | | 701/29.5 |

* cited by examiner

FIG. 8

SERVICE-RELATED RECORDS SCREEN

SERVICE-RELATED RECORDS

| SERVICE-RELATED RECORDS | CUSTOMER APPARATUS INFORMATION | FAILURE DIAGNOSIS AND PREDICTION | APPARATUS HISTORY | TRANSFER PAPER JAMS | ORIGINAL DOCUMENT JAMS | SC INFORMATION | COUNTER INFORMATION |
|---|---|---|---|---|---|---|---|
| DATE AND HOUR OF DATA ACQUISITION | 2014/6/25 11:24:35 | MODEL NAME (MODEL TYPE) | MFP001 | | TOTAL COUNTER | 123,456 | |
| DATE AND HOUR OF COMMUNICATION | 2000/10/06 | MACHINE NUMBER | 000000 | | YEAR/MONTH/DAY OF INSTALLATION | 2000/10/06 | |

<FAILURE DIAGNOSIS AND PREDICTION>
FAILURE DIAGNOSIS AND PREDICTION AFTER DATE OF LAST VISIT

<TRANSFER PAPER JAMS>

| | MARCH | APRIL | MAY | JUNE | JULY | AUGUST |
|---|---|---|---|---|---|---|
| TOTAL COUNT | 123 | 456 | 666 | 622 | 666 | 444 |
| JAM OCCURRENCE COUNT | 0 | 0 | 1 | 0 | 6 | 0 |
| COUNT/ JAM COUNT | - | - | 666 | - | 111 | - |

<ORIGINAL DOCUMENT JAMS>

| | MARCH | APRIL | MAY | JUNE | JULY | AUGUST |
|---|---|---|---|---|---|---|
| DOCUMENT FEEDING COUNT | 123 | 223 | 444 | 555 | 666 | 555 |
| JAM OCCURRENCE COUNT | 0 | 0 | 0 | 0 | 0 | 0 |
| DOCUMENT FEEDING COUNT/JAM COUNT | - | - | - | - | - | - |

<SC INFORMATION>
STATUS OF SC OCCURRENCES WITHIN 30 DAYS BEFORE TODAY

<PM PARTS INFORMATION>

FIG.9

DIAGNOSIS INFORMATION SCREEN

SERVICE-RELATED RECORDS

| SERVICE-RELATED RECORDS | CUSTOMER APPARATUS INFORMATION | FAILURE DIAGNOSIS AND PREDICTION | APPARATUS HISTORY | TRANSFER PAPER JAMS | ORIGINAL DOCUMENT JAMS | SC INFORMATION | COUNTER INFORMATION |
|---|---|---|---|---|---|---|---|
| DATE AND HOUR OF DATA ACQUISITION | 2014/8/25 11:24:35 | MODEL NAME (MODEL TYPE) | MFP001 | | TOTAL COUNTER | 123,456 | |
| DATE AND HOUR OF COMMUNICATION | 2060/10/06 | MACHINE NUMBER | 000000 | | YEAR/MONTH/DAY OF INSTALLATION | 2060/10/06 | |

<FAILURE PREDICTIVE DIAGNOSIS RESULTS>
<ALL FAILURE PREDICTIVE DIAGNOSIS RESULTS>

| DATE OF DIAGNOSIS | TYPE | RESULT | WORK INSTRUCTIONS (ACTION) | DETAILS OF DIAGNOSIS RESULT |
|---|---|---|---|---|
| 2014/08/31 | MANUAL FEED TRAY JAM PREDICTION | SIMULTANE-OUS WORK | REPLACE PAPER FEEDING ROLLER; INSPECT AND CLEAN SENSOR; AND INSTRUCT USER ABOUT PAPER FEEDING PROCEDURE. | DIAGNOSIS PERIOD 2014/7~2014/8 60 PAPER FEEDING ERRORS HAVE OCCURRED. ABNORMALITY OF PAPER FEEDING ROLLER IS SUSPECTED. |
| 2014/09/30 | MANUAL FEED TRAY JAM PREDICTION | SIMULTANE-OUS WORK | REPLACE PAPER FEEDING ROLLER; INSPECT AND CLEAN SENSOR; AND INSTRUCT USER ABOUT PAPER FEEDING PROCEDURE. | DIAGNOSIS PERIOD 2014/8~2014/9 45 PAPER FEEDING ERRORS HAVE OCCURRED. ABNORMALITY OF PAPER FEEDING ROLLER IS SUSPECTED. |

FIG. 10

APPARATUS HISTORY SCREEN

SERVICE-RELATED RECORDS

| SERVICE-RELATED RECORDS | CUSTOMER APPARATUS INFORMATION | FAILURE DIAGNOSIS AND PREDICTION | APPARATUS HISTORY | TRANSFER PAPER JAMS | ORIGINAL DOCUMENT JAMS | SC INFORMATION | COUNTER INFORMATION |
|---|---|---|---|---|---|---|---|
| DATE AND HOUR OF DATA ACQUISITION | 2014/08/25 11:24:35 | MODEL NAME (MODEL TYPE) | MFP001 | | TOTAL COUNTER | 123,456 | |
| DATE AND HOUR OF COMMUNICATION | 2000/10/06 | MACHINE NUMBER | 000000 | | YEAR/MONTH/DAY OF INSTALLATION | 2000/10/06 | |

<APPARATUS HISTORY>
☐ JAM
☐ SC

SELECT ALL    CLEAR ALL SELECTIONS

[ NARROW DOWN ]

| | DATE AND HOUR | CATEGORY | SPECIFICS | ACTION | TC | PAPER SIZE | JAM INTERVAL | REMARKS |
|---|---|---|---|---|---|---|---|---|
| 1 | 2014/08/25 11:24:35 | SC | SOFTWARE MALFUNCTION | | 665 | | | |
| 2 | 2014/08/26 11:24:35 | JAM | PAPER FEEDING ERROR | | 667 | A5: LANDSCAPE | 0 | |
| 3 | 2014/08/27 11:24:35 | JAM | PAPER FEEDING ERROR | | 667 | A5: LANDSCAPE | 0 | |

FIG.11

APPARATUS STATE (TRANSFER PAPER JAM) SCREEN

SERVICE-RELATED RECORDS

| SERVICE-RELATED RECORDS | CUSTOMER APPARATUS INFORMATION | FAILURE DIAGNOSIS AND PREDICTION | APPARATUS HISTORY | TRANSFER PAPER JAMS | ORIGINAL DOCUMENT JAMS | SC INFORMATION | COUNTER INFORMATION |
|---|---|---|---|---|---|---|---|
| DATE AND HOUR OF DATA ACQUISITION | 2014/08/25 11:24:35 | MODEL NAME (MODEL TYPE) | MFP001 | | TOTAL COUNTER | 123,456 | |
| DATE AND HOUR OF COMMUNICATION | 2000/10/06 | MACHINE NUMBER | 000000 | | YEAR/MONTH/DAY OF INSTALLATION | 2000/10/06 | |

<TRANSFER PAPER JAMS>
<MONTHLY JAM OCCURRENCE COUNTS (IN PAST 13 MONTHS)>

| | AUGUST | SEPTEMBER | OCTOBER | NOVEMBER | DECEMBER | JANUARY | FEBRUARY | MARCH | APRIL | MAY | JUNE | JULY | AUGUST |
|---|---|---|---|---|---|---|---|---|---|---|---|---|---|
| JAM OCCURRENCE COUNT | 0 | - | 4 | - | 2 | - | - | - | - | 3 | - | 6 | - |
| CUMULATIVE TOTAL | 0 | 0 | 1 | 4 | 6 | 6 | 6 | 6 | 6 | 9 | 9 | 15 | 15 |

DISPLAY GRAPH
<JAM COUNT BY PAPER SIZE>

| JAM COUNT BY PAPER SIZE | A5: LANDSCAPE | A3: PORTRAIT | B4: PORTRAIT | A4: LANDSCAPE |
|---|---|---|---|---|
| | 11 | 1 | 1 | 2 |

<JAM OCCURRENCE HISTORY>

| | JAM LOCATION | JAM CD | DATE AND HOUR OF OCCURRENCE | PAPER SIZE | TC |
|---|---|---|---|---|---|
| 1 | TRAY 2 PAPER FEEDING ERROR | 4 | 2014/08/25 01:24:25 | A5: LANDSCAPE | 665 |

FIG.12

APPARATUS STATE (ORIGINAL DOCUMENT JAM) SCREEN

SERVICE-RELATED RECORDS

| SERVICE-RELATED RECORDS | CUSTOMER APPARATUS INFORMATION | FAILURE DIAGNOSIS AND PREDICTION | APPARATUS HISTORY | TRANSFER PAPER JAMS | ORIGINAL DOCUMENT JAMS | SC INFORMATION | COUNTER INFORMATION |
|---|---|---|---|---|---|---|---|
| DATE AND HOUR OF DATA ACQUISITION | 2014/08/25 11:24:35 | MODEL NAME (MODEL TYPE) | MFP001 | | TOTAL COUNTER | 123,456 | |
| DATE AND HOUR OF COMMUNICATION | 2000/10/06 | MACHINE NUMBER | 000000 | | YEAR/MONTH/DAY OF INSTALLATION | 2000/10/06 | |

<ORIGINAL DOCUMENT JAMS>
<MONTHLY JAM OCCURRENCE COUNTS (IN PAST 13 MONTHS)>

| | AUGUST | SEPTEMBER | OCTOBER | NOVEMBER | DECEMBER | JANUARY | FEBRUARY | MARCH | APRIL | MAY | JUNE | JULY | AUGUST |
|---|---|---|---|---|---|---|---|---|---|---|---|---|---|
| JAM OCCURRENCE COUNT | 9 | 9 | 4 | 3 | 2 | 12 | 4 | 3 | 6 | 3 | 4 | 1 | 1 |
| CUMULATIVE TOTAL | 9 | 18 | 22 | 25 | 27 | 39 | 43 | 46 | 52 | 55 | 59 | 60 | 61 |

DISPLAY GRAPH

<JAM OCCURRENCE HISTORY>

| | JAM LOCATION | JAM CD | DATE AND HOUR OF OCCURRENCE | PAPER SIZE | TC | ADF |
|---|---|---|---|---|---|---|
| 1 | NO DETECTION BY SENSOR A | 4 | 2014/08/25 02:24:35 | NO PAPER | 665 | 223 |
| 2 | CONGESTION AT SENSOR B | 22 | 2014/08/25 03:24:35 | A4; PORTRAIT | 667 | 244 |

FIG.13

SC OCCURRENCE HISTORY SCREEN

SERVICE-RELATED RECORDS

| SERVICE-RELATED RECORDS | CUSTOMER APPARATUS INFORMATION | FAILURE DIAGNOSIS AND PREDICTION | APPARATUS HISTORY | TRANSFER PAPER JAMS | ORIGINAL DOCUMENT JAMS | SC INFORMATION | COUNTER INFORMATION |
|---|---|---|---|---|---|---|---|
| DATE AND HOUR OF DATA ACQUISITION | 2014/08/25 11:24:35 | MODEL NAME (MODEL TYPE) | MFP001 | | TOTAL COUNTER | 123,456 | |
| DATE AND HOUR OF COMMUNICATION | 2000/10/06 | MACHINE NUMBER | 000000 | | YEAR/MONTH/DAY OF INSTALLATION | 2000/10/06 | |

<SC INFORMATION>
<TOP 5 KINDS SINCE LAST VISIT>

| | SC NUMBER | SC SUB-NUMBER | SC CONTENT |
|---|---|---|---|
| 1 | 001 | 1 | MALFUNCTION OF SOFTWARE A |
| 2 | 002 | 2 | OUTPUTTING ABNORMALITY |
| 3 | 003 | 3 | MALFUNCTION OF SOFTWARE B |

<SC OCCURRENCE HISTORY>

| | SC NUMBER | SC CONTENT | DATE AND HOUR OF OCCURRENCE |
|---|---|---|---|
| 1 | 001 | MALFUNCTION OF SOFTWARE A | 2014/07/07 20:20:20 |
| 2 | 001 | MALFUNCTION OF SOFTWARE A | 2014/07/07 21:21:21 |
| 3 | 001 | MALFUNCTION OF SOFTWARE A | 2014/07/07 22:22:22 |

FIG.14

COUNTER INFORMATION SCREEN

SERVICE-RELATED RECORDS

| SERVICE-RELATED RECORDS | CUSTOMER APPARATUS INFORMATION | FAILURE DIAGNOSIS AND PREDICTION | APPARATUS HISTORY | TRANSFER PAPER JAMS | ORIGINAL DOCUMENT JAMS | SC INFORMATION | COUNTER INFORMATION |
|---|---|---|---|---|---|---|---|
| DATE AND HOUR OF DATA ACQUISITION | 2014/08/25 11:24:35 | MODEL NAME (MODEL TYPE) | MFP001 | | TOTAL COUNTER | 123,456 | |
| DATE AND HOUR OF COMMUNICATION | 2000/10/06 | MACHINE NUMBER | 000000 | | YEAR/MONTH/DAY OF INSTALLATION | 2000/10/06 | |

<INFORMATION ON COUNTERS>
<MONTHLY COUNTS OF FEE CHARGING COUNTER IN PAST 13 MONTHS>

| | AUGUST | SEPTEMBER | OCTOBER | NOVEMBER | DECEMBER | JANUARY | FEBRUARY | MARCH | APRIL | MAY | JUNE | JULY | AUGUST |
|---|---|---|---|---|---|---|---|---|---|---|---|---|---|
| TOTAL | 758 | 555 | 666 | 593 | 957 | 435 | 789 | 555 | 927 | 689 | 662 | 683 | 743 |
| FULL-COLOR | 11 | 5 | 44 | 321 | 91 | 22 | 15 | 89 | 47 | 1 | 14 | 0 | 5 |
| MONOCHROME | 747 | 550 | 710 | 914 | 866 | 457 | 774 | 644 | 880 | 670 | 648 | 678 | 738 |

DISPLAY GRAPH

<MONTHLY COUNTS OF COUNTER BY ADF IN PAST 13 MONTHS>

| | AUGUST | SEPTEMBER | OCTOBER | NOVEMBER | DECEMBER | JANUARY | FEBRUARY | MARCH | APRIL | MAY | JUNE | JULY | AUGUST |
|---|---|---|---|---|---|---|---|---|---|---|---|---|---|
| FACE SIDE | 297 | 113 | 293 | 247 | 348 | 317 | 248 | 227 | 313 | 440 | 231 | 244 | 226 |
| REVERSE SIDE | 0 | 5 | 0 | 0 | 0 | 0 | 0 | 5 | 0 | 0 | 0 | 1 | 0 |

DISPLAY GRAPH

<MONTHLY COUNTS OF COUNTER BY APPLICATION IN PAST 13 MONTHS>

| | AUGUST | SEPTEMBER | OCTOBER | NOVEMBER | DECEMBER | JANUARY | FEBRUARY | MARCH | APRIL | MAY | JUNE | JULY | AUGUST |
|---|---|---|---|---|---|---|---|---|---|---|---|---|---|
| COPY | 458 | 440 | 466 | 489 | 501 | 460 | 492 | 513 | 596 | 461 | 336 | 428 | 381 |
| FACSIMILE | 300 | 328 | 354 | 309 | 321 | 227 | 399 | 285 | 399 | 297 | 267 | 316 | 234 |
| PRINTER | 0 | 2 | 0 | 6 | 0 | 2 | 0 | 4 | 0 | 0 | 0 | 0 | 0 |

DISPLAY GRAPH

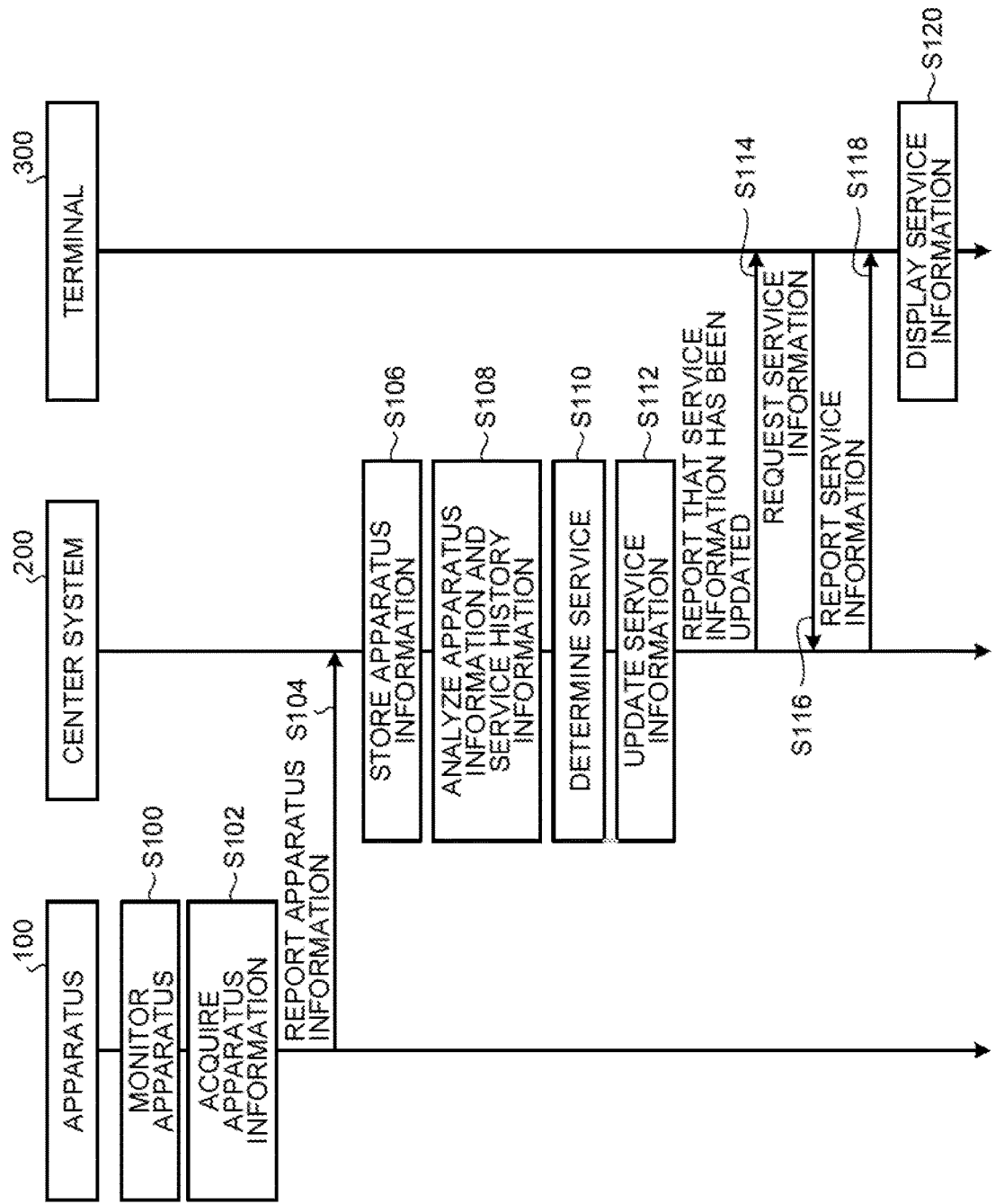

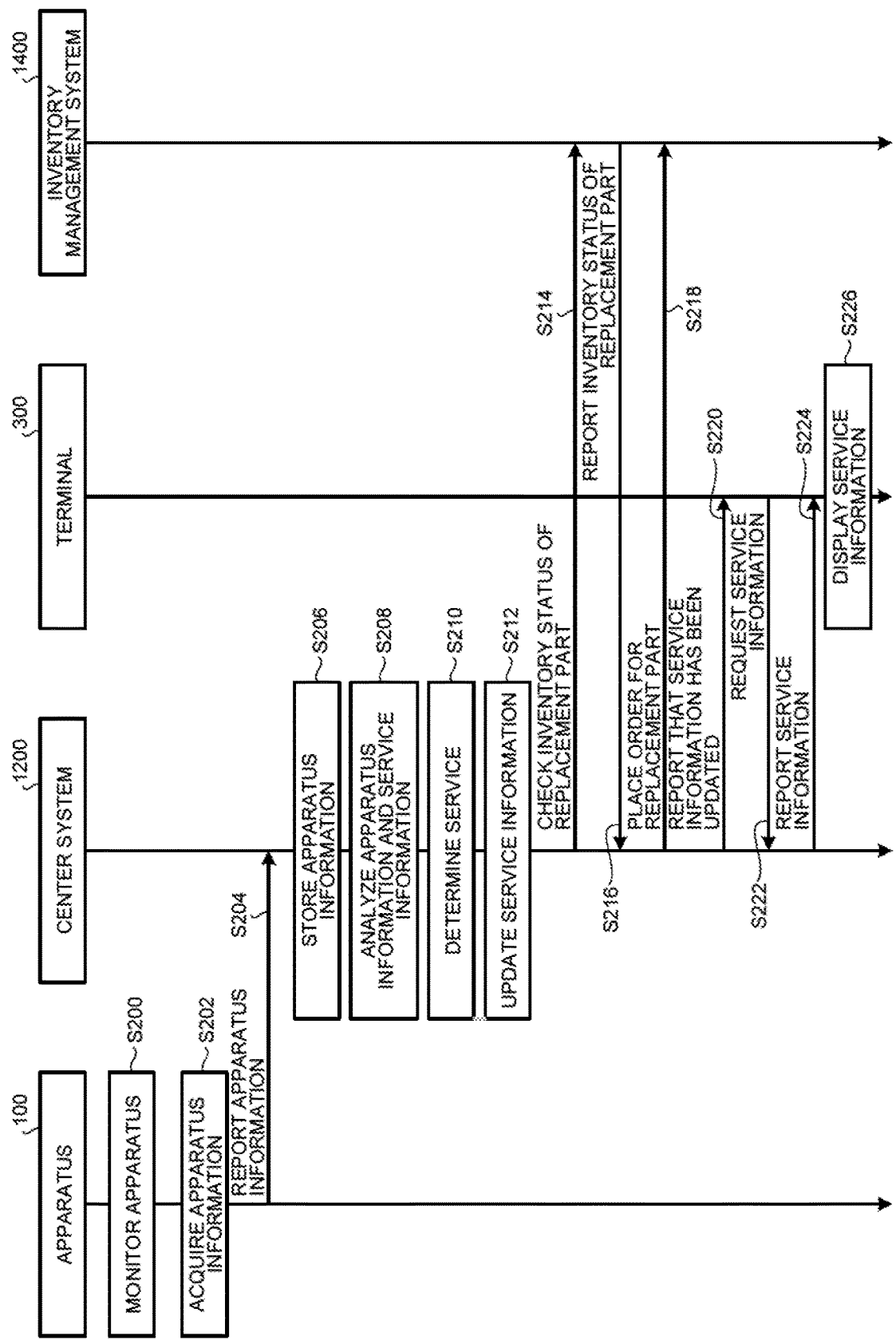

SYSTEM AND SERVICE DETERMINATION METHOD

CROSS-REFERENCE TO RELATED APPLICATIONS

The present application claims priority to and incorporates by reference the entire contents of Japanese Patent Application No. 2014-201925 filed in Japan on Sep. 30, 2014 and Japanese Patent Application No. 2015-181829 filed in Japan on Sep. 15, 2015.

BACKGROUND OF THE INVENTION

1. Field of the Invention

The present invention relates to a system and a service determination method.

2. Description of the Related Art

There has been a conventionally known technique configured to: remotely collect information from an image forming apparatus installed in a customer environment; upon detection of an abnormality, send a maintenance person for maintenance work to be performed; and set up a plan for preventive maintenance (maintenance before expendable parts are used up) of expendable parts by analyzing the collected information and predicting when to replace expendable parts (see, for example, Japanese Patent No. 4943241).

Such a conventional technique as described above effectively utilizes results of analyses on information acquired from an apparatus for various maintenance services, but merely reports the occurrence of maintenance needing to be performed and predicts the timing of occurrence of maintenance that would need to be performed.

Consequently, such a conventional technique as described above tends to increase visits of customer engineers to a customer environment for maintenance work to be performed on an apparatus, thus tending to reduce the efficiency of maintenance work.

In view of the above, and there is a need to provide a system and a service determination method that can enhance the efficiency of maintenance work while enabling effective utilization of results of analyses on information acquired from an apparatus.

SUMMARY OF THE INVENTION

It is an object of the present invention to at least partially solve the problems in the conventional technology.

A system includes: an apparatus information acquiring unit to acquire, from an apparatus, apparatus information regarding the apparatus; an analysis unit to make an analysis based on the acquired apparatus information; and a service determining unit to determine, on the basis of a result of the analysis, which service of a plurality of services should be provided for the apparatus, the services including a first service of additionally performing maintenance based on the result of the analysis when next other maintenance is performed for the apparatus.

A system includes an apparatus and an information processing system. The apparatus includes: an apparatus monitoring unit to monitor the apparatus to generate apparatus information regarding the apparatus; and an apparatus information reporting unit to report the generated apparatus information to the information processing system. The information processing system includes: an apparatus information acquiring unit to acquire the reported apparatus information from the apparatus; an analysis unit to make an analysis based on the acquired apparatus information; and a service determining unit to determine, on the basis of a result of the analysis, which service of a plurality of services should be provided for the apparatus, the services including a first service of additionally performing maintenance based on the result of the analysis when next other maintenance is performed for the apparatus.

A service determination method includes: acquiring, from an apparatus, apparatus information regarding the apparatus; making an analysis based on the acquired apparatus information; and determining, on the basis of a result of the analysis, which service of a plurality of services should be provided for the apparatus, the services including a first service of additionally performing maintenance based on the result of the analysis when next other maintenance is performed for the apparatus.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 8 is a view illustrating service-related records in the first embodiment;

FIG. 9 is a view illustrating failure diagnosis and prediction in the first embodiment;

FIG. 10 is a view illustrating an apparatus history in the first embodiment;

FIG. 11 is a view illustrating transfer paper jams in the first embodiment;

FIG. 12 is a view illustrating original document jams in the first embodiment;

FIG. 13 is a view illustrating SC information in the first embodiment;

FIG. 14 is a view illustrating counter information in the first embodiment;

FIG. 15 is a sequence diagram illustrating exemplary processing that is performed by the system in the first embodiment;

FIG. 20 is a sequence diagram illustrating exemplary processing that is performed by the system in the second embodiment.

DETAILED DESCRIPTION OF THE PREFERRED EMBODIMENTS

The following describes embodiments of a system and a service determination method according to the present invention in detail with reference to the attached drawings.

First Embodiment

Figure 1:
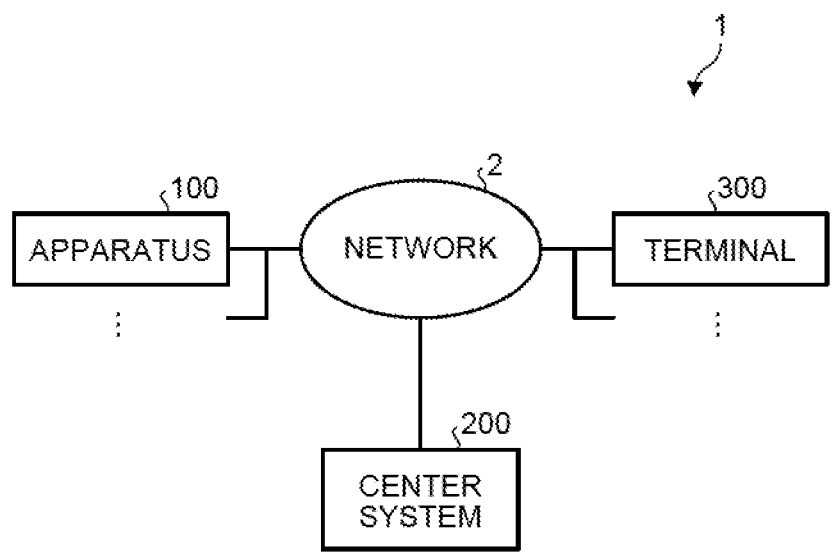
FIG. 1 is a block diagram illustrating an exemplary structure of a system in a first embodiment.

FIG. 1 is a block diagram illustrating an exemplary structure of a system 1 in a first embodiment. As illustrated in FIG. 1, the system 1 includes an apparatus 100, a center system 200 (one example of an information processing system), and a terminal 300.

The apparatus 100, the center system 200, and the terminal 300 are connected to one another via a network 2. The network 2 can be implemented, for example, by the Internet or a local area network (LAN).

The apparatus 100 is an apparatus under management installed in a customer environment. Examples of the apparatus 100 include: image forming apparatuses such as a printing machine, a copy machine, a multifunction peripheral (MFP), a scanner device, and a facsimile machine; various electronic devices such as a projector, a camera, an air conditioner, a refrigerator, a fluorescent lamp, a vending machine, and a handheld terminal; and information processing apparatuses such as a personal computer (PC). An MFP is a device that has at least two functions of the copy function, the print function, the scanner function, and the facsimile function.

The first embodiment is described with the apparatus 100 exemplified by an image forming apparatus connectable with the network 2. However, the apparatus 100 is not limited to this image forming apparatus. For example, the apparatus 100 may be an apparatus that is not connected with the network 2. In such a case, the apparatus 100 may be connected with, for example, a mediation device connected with the network 2. There are actually a plurality of apparatuses 100 although the example given in FIG. 1 illustrates only one of the apparatuses 100.

The center system 200 is a system including one or more information processing apparatuses. The center system 200 manages the state of the apparatus 100, thereby determining which service should be provided to the apparatus 100.

The terminal 300 is a terminal to be used by a customer engineer that provides services for the apparatus 100, and examples thereof include a tablet terminal, a smartphone, and a PC. The terminal 300 displays thereon service information regarding a service determined by the center system 200, thereby supporting a customer engineer in providing services for the apparatus 100. There are actually a plurality (for example, corresponding to the number of customer engineers) of terminals 300 although the example given in FIG. 1 illustrates only one of the terminals 300.

Figure 2:
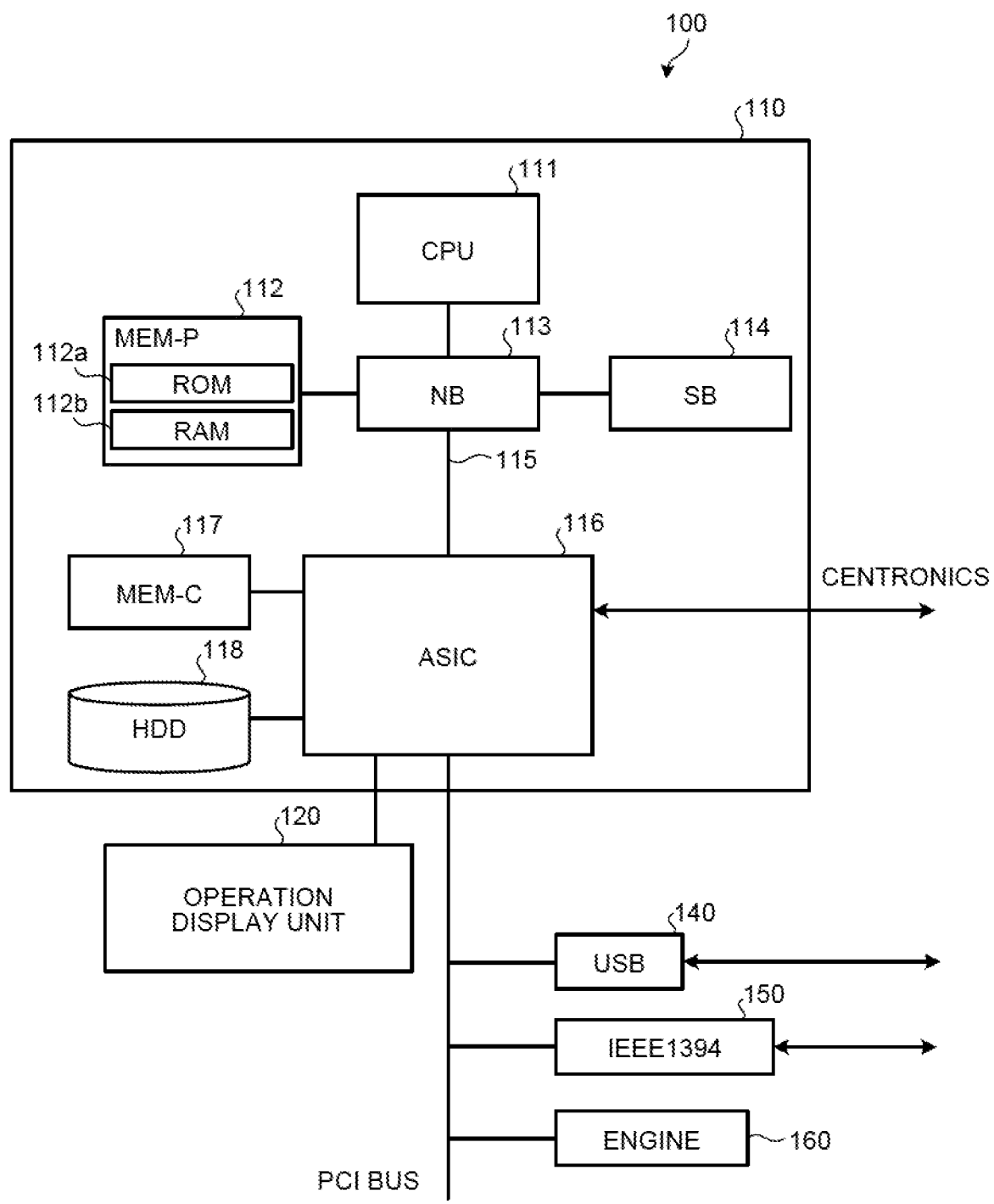
FIG. 2 is a block diagram illustrating an exemplary hardware structure of an apparatus in the first embodiment.

FIG. 2 is a block diagram illustrating an exemplary hardware structure of the apparatus 100 in the first embodiment. As illustrated in FIG. 2, the apparatus 100 has a structure having a controller 110 and an engine unit 160 connected to each other via a peripheral component interconnect (PCI) bus. The controller 110 is a controller that controls the overall control of entire the apparatus 100, drawing, communication, and input from an operation display unit 120. The engine unit 160 is an engine connectable with the PCI bus, and examples thereof include: a printer engine such as a black-and-white plotter, a one-drum color plotter, or a four-drum color plotter; and a scanner engine for a scanner or the like. The engine unit 160 includes not only an engine part but also image processing parts for, for example, error diffusion and gamma conversion.

The controller 110 includes a central processing unit (CPU) 111, a north bridge (NB) 113, a system memory (MEM-P) 112, a south bridge (SB) 114, a local memory (MEM-C) 117, an application specific integrated circuit (ASIC) 116, and a hard disk drive (HDD) 118, and has a structure obtained by connecting the NB 113 and the ASIC 116 via an accelerated graphics port (AGP) bus 115. The MEM-P 112 further includes a read-only memory (ROM) 112a and a random access memory (RAM) 112b.

Being configured to control the entirety of the apparatus 100, the CPU 111 has a chip set composed of the NB 113, the MEM-P 112, and the SB 114, and is connected to another apparatus via this chip set.

The NB 113 is a bridge for connecting the CPU 111 to the MEM-P 112, the SB 114, and the AGP bus 115, and has: a memory controller that controls, for example, reading and writing from and into the MEM-P 112; and a PCI master and an AGP target.

The MEM-P 112 is a system memory to be used, for example, as a memory for storing therein a computer program and data, a memory for loading a computer program and data, and a memory for drawing of a printer, and is composed of the ROM 112a the RAM 112b. While the ROM 112a is a read-only memory to be used as a memory for storing therein a computer program and data, the RAM 112b is a writable and readable memory to be used as a memory for loading a computer program and data, and a memory for drawing of a printer.

The SB 114 is a bridge for connecting the NB 113 to a PCI device and a peripheral device. While this SB 114 is connected to the NB 113 via the PCI bus, such units as a network interface (I/F) unit are further connected to this PCI bus.

The ASIC 116 is an integrated circuit (IC) having image-processing hardware elements and specifically intended for image processing, and functions as a bridge that connects the AGP bus 115, the PCI bus, the HDD 118, and the MEM-C 117 to one another. This ASIC 116 is composed of: a PCI target and an AGP master; an arbiter (APRB) as a core of the ASIC 116; a memory controller that controls the MEM-C 117; a plurality of direct memory access controllers (DMAC) that perform, for example, rotation of image data on the basis of a hardware logic or the like; a PCI unit that transfers data from and to the engine unit 160 via the PCI bus. To this ASIC 116, a USB 140 and an IEEE 1394 (the Institute of Electrical and Electronics Engineers 1394) interface (I/F) 150 are connected via the PCI bus. The operation display unit 120 is directly connected to the ASIC 116.

The MEM-C 117 is a local memory to be used as an image buffer for copy and a code buffer, and the HDD 118 is a storage for accumulating image data, accumulating computer programs, accumulating font data, and accumulating forms.

The AGP bus 115 is a bus interface for a graphics accelerator card proposed for accelerating graphics processing, and speeds up a graphics accelerator card by directly accessing the MEM-P 112 at high throughput.

Figure 3:
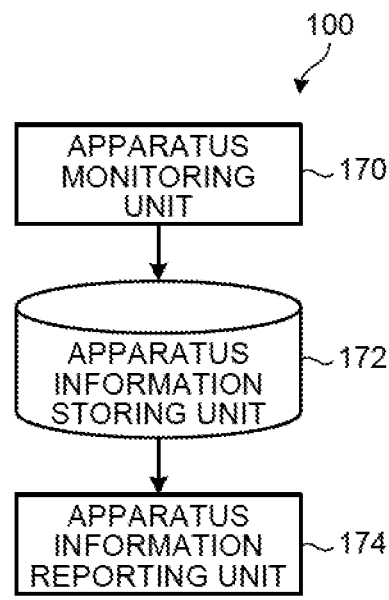
FIG. 3 is a block diagram illustrating an exemplary functional structure of the apparatus in the first embodiment.

FIG. 3 is a block diagram illustrating an exemplary functional structure of the apparatus 100 in the first embodiment. As illustrated in FIG. 3, the apparatus 100 includes an apparatus monitoring unit 170, an apparatus information storing unit 172, and an apparatus information reporting unit 174.

The apparatus monitoring unit 170 and the apparatus information reporting unit 174 are implemented by, for example, the CPU 111 and the MEM-P 112. The apparatus information storing unit 172 is implemented by, for example, at least one of the HDD 118 and the MEM-P 112.

The apparatus monitoring unit 170 monitors the apparatus 100, generates apparatus information on the apparatus 100, and stores the apparatus information in the apparatus information storing unit 172. The apparatus information contains identification information for identifying the apparatus 100 and state information regarding the state of the apparatus 100. Examples of the identification information include a serial number, a model name, and a media access control (MAC) address. Examples of the state information are, for example, failure information regarding failures that have occurred in the apparatus 100 and expendable parts information regarding expendable parts.

Examples of the failure information include occurrence locations and occurrence dates and hours when a paper jam (JAM) is the failure. When presence of dirt on a transfer belt is the failure, examples of the failure information include a sensor value of a sensor that detects dirt. The failure information may contain, with respect to each failure, a history (past information) regarding a predetermined number of times the failure has occurred, in addition to the most recent information.

Examples of the expendable parts information include: information indicating how much the expendable parts have been used up (for example, a counter count and the number of times an expendable part has been used); predetermined service life values (values assured by manufacturers) of the expendable parts; the number of pages per job; and temperature and humidity.

Here, pieces of information contained in the apparatus information are not limited to the above-described examples.

The apparatus information reporting unit 174 reports to the center system 200 the apparatus information generated by the apparatus monitoring unit 170. This embodiment assumes that the apparatus information reporting unit 174 acquires the apparatus information from the apparatus information storing unit 172 once a day and then reports it to the center system 200. This assumption, however, is not limiting.

Figure 4:
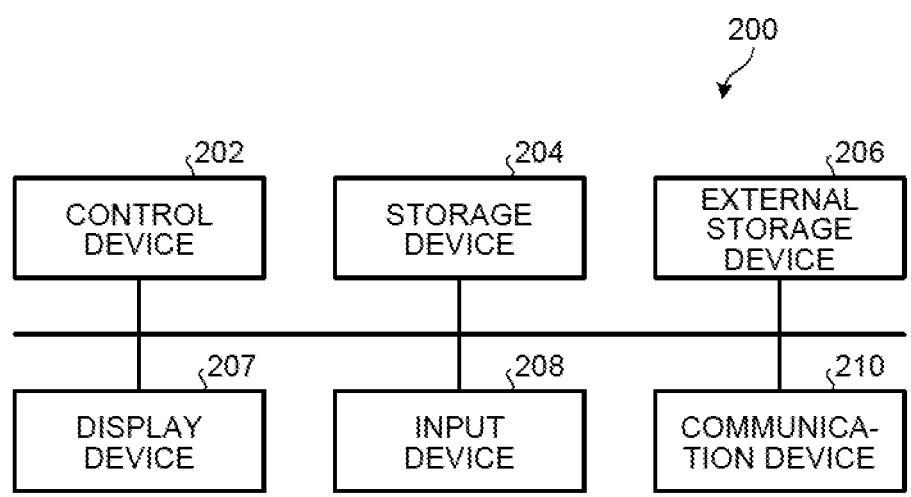
FIG. 4 is a block diagram illustrating an exemplary hardware structure of a center system in the first embodiment.

FIG. 4 is a block diagram illustrating an exemplary hardware structure of the center system 200 in the first embodiment. The center system 200 includes a control device 202 such as a CPU and a graphics processing unit (GPU), a storage device 204 such as a ROM and a RAM, an external storage device 206 such as an HDD or a solid state drive (SSD), a display device 207 such as a display, an input device 208 such as a keyboard and a mouse, and a communication device 210 such as a communication interface, thus having a hardware structure utilizing a typical computer.

Figure 5:
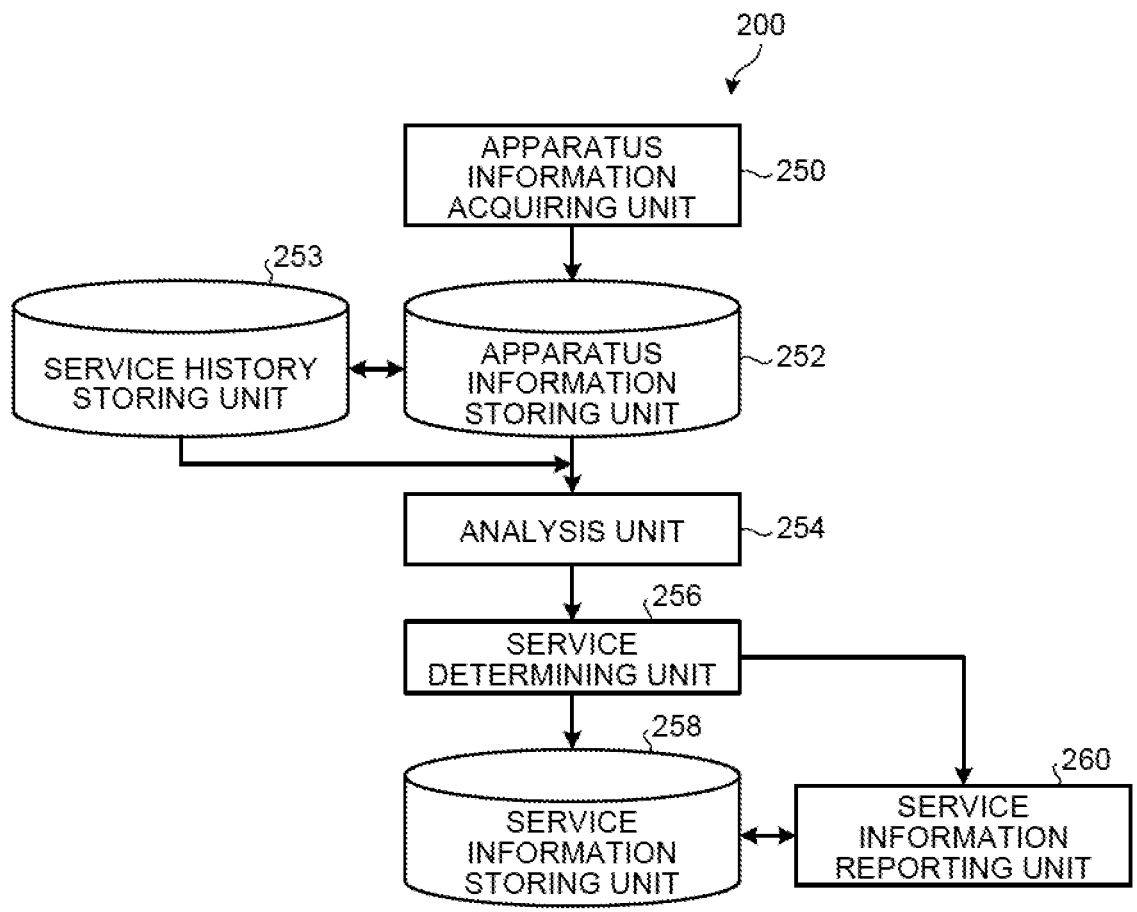
FIG. 5 is a block diagram illustrating an exemplary functional structure of the center system in the first embodiment.

FIG. 5 is a block diagram illustrating an exemplary functional structure of the center system 200 in the first embodiment. As illustrated in FIG. 5, the center system 200 includes an apparatus information acquiring unit 250, an apparatus information storing unit 252, a service history storing unit 253, an analysis unit 254, a service determining unit 256, a service information storing unit 258, and a service information reporting unit 260.

The apparatus information acquiring unit 250, the analysis unit 254, the service determining unit 256, and the service information reporting unit 260 can be implemented, for example, by the control device 202 and the storage device 204. The apparatus information storing unit 252, the service history storing unit 253, and the service information storing unit 258 can be implemented, for example, by at least one of the storage device 204 and the external storage device 206.

The apparatus information acquiring unit 250 acquires, from the apparatus 100, the apparatus information regarding this apparatus 100, and stores this apparatus information in the apparatus information storing unit 252. Here, when there is redundancy between the apparatus information on the apparatus 100 already stored in the apparatus information storing unit 252 and the apparatus information on the apparatus 100 to be newly stored in the apparatus information storing unit 252, the apparatus information acquiring unit 250 may store the apparatus information in the apparatus information storing unit 252 after merging the redundant parts of the information.

The service history storing unit 253 stores therein service history information indicating execution histories of a plurality of services provided to the apparatus 100. Examples of an execution history of a service include, for example, a history of maintenance work performed on the apparatus 100 by customer engineers on visits to the customer environment. Exemplary contents of the history of maintenance work include the serial number and the model name of the apparatus 100 subjected to maintenance work, a kind of the maintenance work, descriptions of the maintenance work, date and hour of occurrence, and date and hour of completion.

Exemplary kinds of maintenance work include but are not limited to: posterior maintenance for performing maintenance for a failure after the failure has occurred; anterior maintenance for providing maintenance for a failure when the failure is predicted to occur; preventive maintenance for performing maintenance according to a preventive maintenance plan; and regular maintenance for performing maintenance (inspection) on a regular basis as set forth in a contract with a customer. This embodiment assumes that posterior maintenance is performed when a customer has made a request for maintenance. This assumption, however, is not limiting.

A customer engineer may store the service history information in the service history storing unit 253 using the terminal 300 or via the input device 208.

The analysis unit 254 makes analyses based on the apparatus information acquired by the apparatus information acquiring unit 250. Specifically, the analysis unit 254 makes analyses on one or more analysis items on the basis of the apparatus information stored in the apparatus information storing unit 252. Examples of the analysis items include an item related to a failure and an item related to an expendable part.

For example, the analysis unit 254 acquires the apparatus information stored in the apparatus information storing unit 252 and the service history information stored in the service history storing unit 253, and makes an analysis on an item related to a failure on the basis of the acquired apparatus information and the service history information. Specifically, the analysis unit 254 makes an analysis on the acquired apparatus information and the service history information to generate a pattern indicating how a rate of posterior maintenance increases depending on changes in the probability that a failure occurs within a predetermined period. The analysis unit 254 then calculates, from the acquired apparatus information, the probability that the failure occurs within the predetermined period, and makes an analysis on information based on this occurrence probability. The information based on the occurrence probability is, for example, a result of comparison between the calculated occurrence probability and the occurrence probability indicated in the generated pattern. Here, a known prediction method such as the Weibull analysis method or the decision-tree method may be used for generation of a pattern.

Also for example, the analysis unit 254 acquires the apparatus information stored in the apparatus information storing unit 252, and makes an analysis on an item related to an expendable part on the basis of the acquired apparatus information. Specifically, the analysis unit 254 calculates the actual service life of an expendable part in relation to a predetermined service life value of the expendable part while taking into account such information as information indicating how much the expendable part has been used up, the number of pages per job, and temperatures and humidity levels. The analysis unit 254 then analyzes a lapse rate or a lapse period relative to the actual service life.

The service determining unit 256 determines, on the basis of a result of the analysis from the analysis unit 254, which service of a plurality of services should be provided to the apparatus 100. The services include a first service of additionally performing maintenance based on the analysis result when next other maintenance is performed on the apparatus 100. The next other maintenance refers to maintenance to be performed earliest among posterior maintenance, anterior maintenance, preventive maintenance, and regular maintenance. Here, the services include a second service of performing maintenance based on the analysis result within a predetermined period, and a third service of performing preventive maintenance based on the analysis result. The second service corresponds to anterior maintenance as described above, and the third service corresponds to setting up a preventive maintenance plan as described above.

For example, when a result of the analysis on an analysis item from the analysis unit 254 satisfies a first condition, the service determining unit 256 determines that the first service should be provided to the analysis item. The service determining unit 256 then writes, into the service information on the apparatus 100 stored in the service information storing unit 258, information indicating that the first service is to be provided to the analysis item.

Examples of the first condition include: when the calculated occurrence probability of the failure within the predetermined period is higher than the occurrence probability in the generated pattern of the failure within the predetermined period; and when the lapse rate or the lapse period relative to the actual service life of the expendable part indicates that the actual service life is near to ending. Since conditions for determining whether the actual service life is near to ending are different for different expendable parts, the first condition may be defined differently with respect to different expendable parts.

Also for example, when a result of the analysis on an analysis item from the analysis unit 254 satisfies a second condition, the service determining unit 256 determines that the second service should be provided to the analysis item. The service determining unit 256 then writes, into the service information on the apparatus 100 stored in the service information storing unit 258, information indicating that the second service is to be provided to the analysis item.

Examples of the second condition include: when the calculated occurrence probability of the failure within the predetermined period is extremely higher than the occurrence probability in the generated pattern of the failure within the predetermined period; and when a lapse rate or a lapse period relative to an actual service life indicates that the actual service life has ended. Here, states determined to be extremely high are different for different failures, the second condition may be defined differently with respect to different failures.

Also for example, when a result of the analysis on an analysis item from the analysis unit 254 satisfies a third condition, the service determining unit 256 determines that the third service should be provided regarding the analysis item. The service determining unit 256 then writes, into the service information on the apparatus 100 stored in the service information storing unit 258, information indicating that the third service (preventive maintenance planning) is to be provided to the analysis item. Examples of the third condition include when the lapse rate or the lapse period relative to the actual service life of the expendable part indicates that the actual service life is not near to ending.

The following describes specific examples of conditions on the basis of which the service determining unit 256 determines which service should be provided. In an assumed situation, the apparatus 100 is an MFP, and just has acquired information regarding paper jams (JAM) from among pieces of the apparatus information acquired from the apparatus information acquiring unit 250.

When "a paper jam has occurred n times consecutively within a predetermined period at a particular location in the MFP" is set as the condition. This is because it can be determined that a customer is highly likely to make a maintenance request when a paper jam has occurred frequently at a particular location. When "the number of sheets copied between occurrence and next occurrence of paper jams has become a number equal to or smaller than a certain threshold n" is also set as the condition. This is because, when a time period between occurrence and next occurrence of paper jams has become shorter, it can be determined that a customer is highly likely to make a maintenance request. For each of these conditions, the service determining unit 256 may determine depending on the urgency of a relevant case which of the first service to the third service should be provided as maintenance for the location.

The threshold of n times varies by occurrence location and by customer. This is because different parts have different durability levels and also because different customers uses the same part in different manners and therefore use it up with different speeds. For this reason, the threshold is changed depending on customers. To thus change the threshold, "how many number of times a paper jam has occurred (an interval between paper jams becomes equal to or lower than a certain number of sheets copied) before each customer makes a maintenance request" may be stored after being calculated from a customer maintenance request history (the service history information) and a past paper jam occurrence history (the apparatus information).

Additionally, a temporal pattern analysis on the occurrence of paper jams can be utilized as the condition. For example, a customer possibly makes a maintenance request when, after successive occurrence of paper jam at first paper feeding that is the most frequently used, the frequencies of paper jam occurrence have risen also at second paper feeding and at third paper feeding. In this case, instead of that "the number of times a paper jam has occurred is equal to or greater than a threshold", that "the number of times a paper jam has occurred at the first paper feeding is greater than or equal to a threshold" may be set as the condition. With this set as the condition for determining that the first service should be performed for maintenance (fixing) for the first paper feeding, the possibility of paper jams at the first paper feeding is eliminated before paper jams occur at the second paper feeding or at the third paper feeding. Thus, a customer is saved the trouble of making a maintenance request.

When "the number of occasions" when a customer has taken a time exceeding a certain threshold to remove a paper jam"has reached a predetermined number" may also be set as the condition. With this set as the condition, maintenance for paper jams can be performed or instructions on clearing paper jams can be provided before a customer unfamiliar with removal of paper jams makes a maintenance request.

When the conditions are set as described above, the conditions may be set differently for different customers on the basis of customer information. For example, a customer uses specialty paper while knowing that use of specialty paper increases the number of times that a paper jam occurs. In this case, the customer does not make a maintenance request for paper jams. Therefore, when "the number of times that a paper jam has occurred has become equal to or greater than a threshold" does not need to be set as a condition.

It is also considered feasible to acquire recorded information on times taken for paper conveyance between a plurality of locations relevant to paper conveyance in a machine with respect to each print job to utilize this information together with the information on paper jams in the analysis. This is because a statistically longer period taken for paper conveyance indicates a higher likelihood that there is a decrease in conveyance ability due to, for example, dirt on paper conveyance parts or degradation thereof and that a paper jam may consequently occur.

The following assumes a case of an error in the sensor in addition to a paper jam.

When "the difference between the initial value and the current value of the sensor value has been calculated and is equal to or greater than a certain constant value" is set as the condition. This is because the difference between sensor values occurs more frequently when there is dirt on the sensor. When this condition is satisfied, it is determined that cleaning of the sensor should be performed as any one of the first service to the third service depending on the urgency (the magnitude of the difference) of a relevant case.

When "the number of times an error correction has been made under automatic control after the occurrence of an internal error has become equal to or greater than a threshold" may be set as the condition. An increase in number of times an error correction has been made is highly likely to result in a fatal error. In such a case, it is therefore determined that maintenance (fixing, replacement, or cleaning) of the sensor should be performed as any one of the first service to the third service depending on the number of times an error correction has been made.

The service information reporting unit 260 reports the service information regarding a service determined by the service determining unit 256. For example, the service information reporting unit 260 reports, to an e-mail address of a customer engineer in charge of the apparatus 100, that the service information of the apparatus 100 has been updated or that the first service has been determined to be provided to the apparatus 100.

Figure 6:
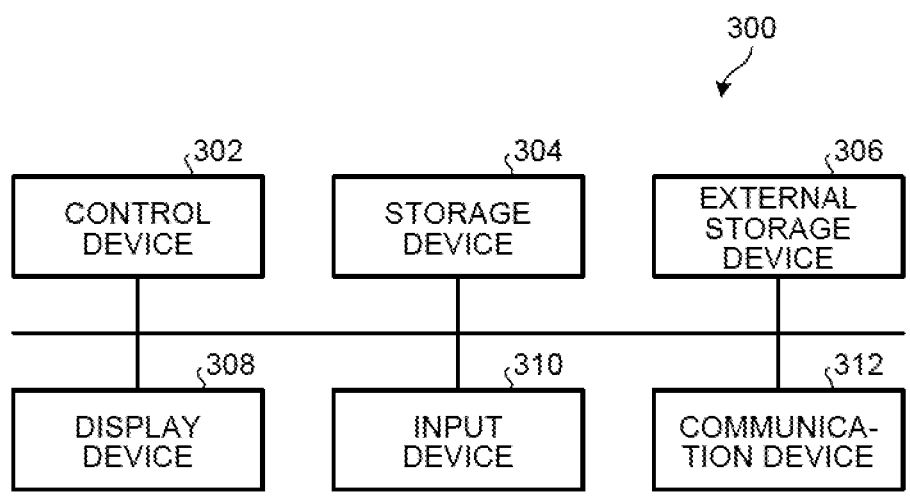
FIG. 6 is a block diagram illustrating an exemplary hardware structure of a terminal in the first embodiment.

FIG. 6 is a block diagram illustrating an exemplary hardware structure of the terminal 300 in the first embodiment. The terminal 300 includes a control device 302 such as a CPU and a GPU, a storage device 304 such as a ROM and a RAM, an external storage device 306 such as an HDD or an SSD, a display unit 308 such as a display, an input device 310 such as a keyboard and a mouse, and a communication unit 312 such as a communication interface, thus having a hardware structure utilizing a usual computer.

Figure 7:
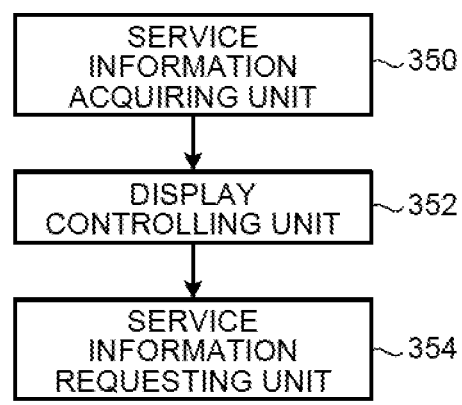
FIG. 7 is a block diagram illustrating an exemplary functional structure of the terminal in the first embodiment.

FIG. 7 is a block diagram illustrating an exemplary functional structure of the terminal 300 in the first embodiment. As illustrated in FIG. 7, the terminal 300 includes a service information acquiring unit 350, a display controlling unit 352, and a service information requesting unit 354.

The service information acquiring unit 350, the display controlling unit 352, and the service information requesting unit 354 can be implemented by, for example, the control device 302 and the storage device 304.

The service information acquiring unit 350 acquires the service information from the center system 200.

The display controlling unit 352 displays the service information acquired by the service information acquiring unit 350 on the display device 308.

When a customer engineer performs an operation via the input device 310 to request acquisition of an additional piece of the service information, the service information requesting unit 354 requests an additional piece of the service information from the center system 200. Thus, the service information acquiring unit 350 acquires an additional piece of the service information from the center system 200.

FIG. 8 to FIG. 14 are views illustrating an example of the service information in the first embodiment, where: FIG. 8 illustrates service-related records in the first embodiment; FIG. 9 illustrates failure diagnosis and prediction in the first embodiment; FIG. 10 illustrates an apparatus history in the first embodiment; FIG. 11 illustrates transfer paper jams in the first embodiment; FIG. 12 illustrates original document jams in the first embodiment; FIG. 13 illustrates SC information (information presented to customer engineers) in the first embodiment; and FIG. 14 illustrates counter information in the first embodiment.

The service information acquiring unit 350 acquires the service information in the service-related records illustrated in FIG. 8 at the beginning, and the display controlling unit 352 displays the service information on the display device 308.

When a link to customer apparatus information is selected via the input device 310, the service information requesting unit 354 requests a piece of the service information that corresponds to the customer apparatus information (not illustrated) from the center system 200, the service information acquiring unit 350 acquires the customer apparatus information, and the display controlling unit 352 causes the display device 308 to display thereon the customer apparatus information.

Otherwise, when a link to failure diagnosis and prediction is selected via the input device 310, the service information requesting unit 354 requests a piece of the service information that corresponds to the failure diagnosis and prediction (FIG. 9) from the center system 200, the service information acquiring unit 350 acquires the failure diagnosis and prediction (FIG. 9), and the display controlling unit 352 causes the display device 308 to display thereon the failure diagnosis and prediction.

In the example illustrated in FIG. 9, the result of the failure diagnosis and prediction indicates simultaneous work, and there appears information that the first service should be provided in response to JAM at a manual feed tray.

Otherwise, when a link to apparatus history is selected via the input device 310, the service information requesting unit 354 requests a piece of the service information that corresponds to the apparatus history (FIG. 10) from the center system 200, the service information acquiring unit 350 acquires the apparatus history (FIG. 10), and the display controlling unit 352 causes the display device 308 to display thereon the apparatus history.

Otherwise, when a link to transfer paper jams is selected via the input device 310, the service information requesting unit 354 requests a piece of the service information that corresponds to the transfer paper jams (FIG. 11) from the center system 200, the service information acquiring unit 350 acquires the transfer paper jams (FIG. 11), and the display controlling unit 352 causes the display device 308 to display thereon the transfer paper jams.

Otherwise, when a link to original document jams is selected via the input device 310, the service information requesting unit 354 requests a piece of the service information that corresponds to the original document jams (FIG. 12) from the center system 200, the service information acquiring unit 350 acquires the original document jams (FIG. 12), and the display controlling unit 352 causes the display device 308 to display thereon the original document jams.

Otherwise, when a link to SC information is selected via the input device 310, the service information requesting unit 354 requests a piece of the service information that corresponds to the SC information (FIG. 13) from the center system 200, the service information acquiring unit 350 acquires the SC information (FIG. 13), and the display controlling unit 352 causes the display device 308 to display thereon the SC information.

Otherwise, when a link to PM parts information is selected via the input device 310, the service information requesting unit 354 requests a piece of the service information that corresponds to the PM parts information (not illustrated) from the center system 200, the service information acquiring unit 350 acquires the PM parts information, and the display controlling unit 352 causes the display device 308 to display thereon the PM parts information.

Otherwise, when a link to firmware information is selected via the input device 310, the service information requesting unit 354 requests a piece of the service information that corresponds to firmware (not illustrated) from the center system 200, the service information acquiring unit 350 acquires the piece of the service information that corresponds to the firmware, and the display controlling unit 352 causes the display device 308 to display thereon the piece of the service information that corresponds to the firmware.

Otherwise, when a link to counter information is selected via the input device 310, the service information requesting unit 354 requests a piece of the service information that corresponds to the counter information (FIG. 14) from the center system 200, the service information acquiring unit 350 acquires the counter information (FIG. 14), and the display controlling unit 352 causes the display device 308 to display thereon the counter information.

FIG. 15 is a sequence diagram illustrating exemplary processing that is performed by the system 1 in the first embodiment.

At the beginning, the apparatus monitoring unit 170 in the apparatus 100 monitors the apparatus 100 to generate apparatus information regarding the apparatus 100, and stores the apparatus information in the apparatus information storing unit 172 (Step S100).

Subsequently, the apparatus information reporting unit 174 in the apparatus 100 acquires the apparatus information from the apparatus information storing unit 172 (Step S102), and reports the apparatus information to the center system 200 (Step S104).

Subsequently, the apparatus information acquiring unit 250 in the center system 200 acquires, from the apparatus 100, the apparatus information regarding this apparatus 100, and stores this apparatus information in the apparatus information storing unit 252 (Step S106).

Subsequently, the analysis unit 254 in the center system 200 makes an analysis based on the apparatus information stored in the apparatus information storing unit 252 and service history information stored in the service history storing unit 253 (Step S108).

Subsequently, the service determining unit 256 in the center system 200 determines, on the basis of an analysis result from the analysis unit 254, which service of a plurality of services should be provided to the apparatus 100 (Step S110), and updates the service information regarding the apparatus 100 stored in the service information storing unit 258 (Step S112). The services include a first service of additionally performing maintenance based on the analysis result when next other maintenance is performed for the apparatus 100.

Subsequently, the service information reporting unit 260 in the center system 200 reports, to the terminal 300 (an e-mail address) of a customer engineer in charge of the apparatus 100, that the service information has been updated (Step S114).

Subsequently, when the customer engineer performs an operation via the input device 310 to make a request for acquiring a piece of the service information, the service information requesting unit 354 in the terminal 300 requests the piece of the service information (Step S116) from the center system 200.

Subsequently, the service information reporting unit 260 in the center system 200 acquires the requested piece of the service information from the service information storing unit 258, and reports it to the terminal 300 (Step S118).

Subsequently, the display controlling unit 352 in the center system 200 causes the display device 308 to display thereon the service information acquired by the service information acquiring unit 350 (Step S120).

Thereafter, the processes at Steps S116 to S120 are repeated.

As described above, according to the first embodiment, which service of a plurality of services should be provided to an apparatus is determined on the basis of a result of analysis on apparatus information regarding the apparatus. The first embodiment thus enables effective utilization of the analysis result of information acquired from the apparatus.

In particular, according to the first embodiment, the services include a service of additionally performing maintenance based on the analysis result when next other maintenance is performed for the apparatus. Therefore, anterior maintenance having low urgency can be performed at the same time as work for other maintenance, and the number of visits of customer engineers to a customer environment is expected to be reduced. The first embodiment thus allows for higher efficiency in maintenance work.

Second Embodiment

In a second embodiment, a case where an order for a replacement part needed for maintenance is automatically placed when the replacement part is not in stock is described. The following mainly describes differences with the first embodiment, and descriptions on components having like functions as those in the first embodiment are omitted with like names and reference numerals assigned thereto.

Figure 16:
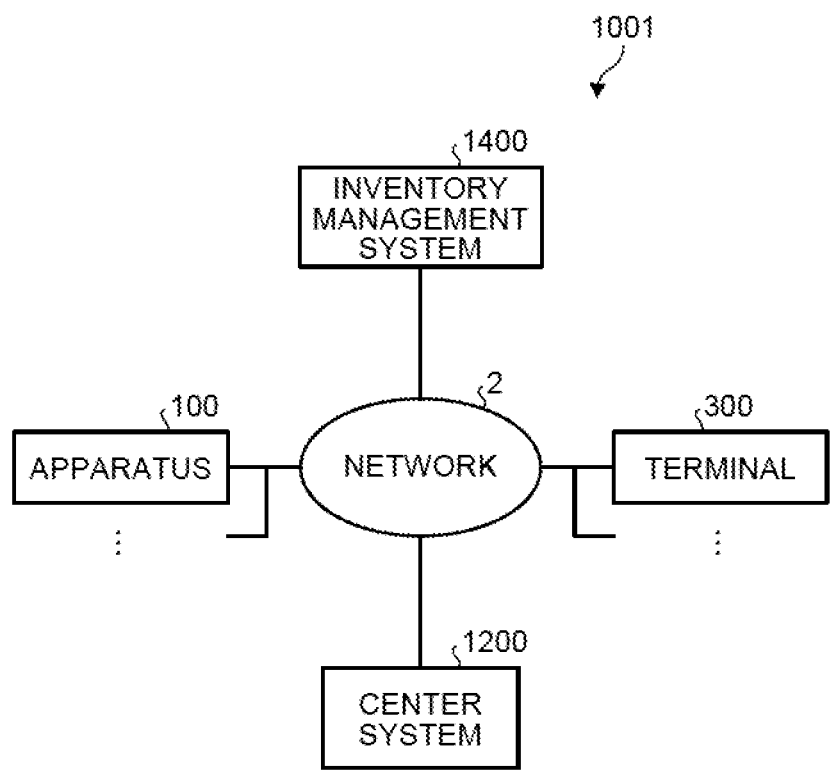
FIG. 16 is a block diagram illustrating an exemplary structure of a system in a second embodiment.

FIG. 16 is a block diagram illustrating an exemplary structure of a system 1001 in the second embodiment. As illustrated in FIG. 16, the system 1001 is different from the first embodiment in further including an inventory management system 1400 and in a center system 1200.

The inventory management system 1400 is a system including one or more information processing apparatuses, and manages inventories of replacement parts for the apparatus 100. The inventory management system 1400 is connected to the network 2.

Figure 17:
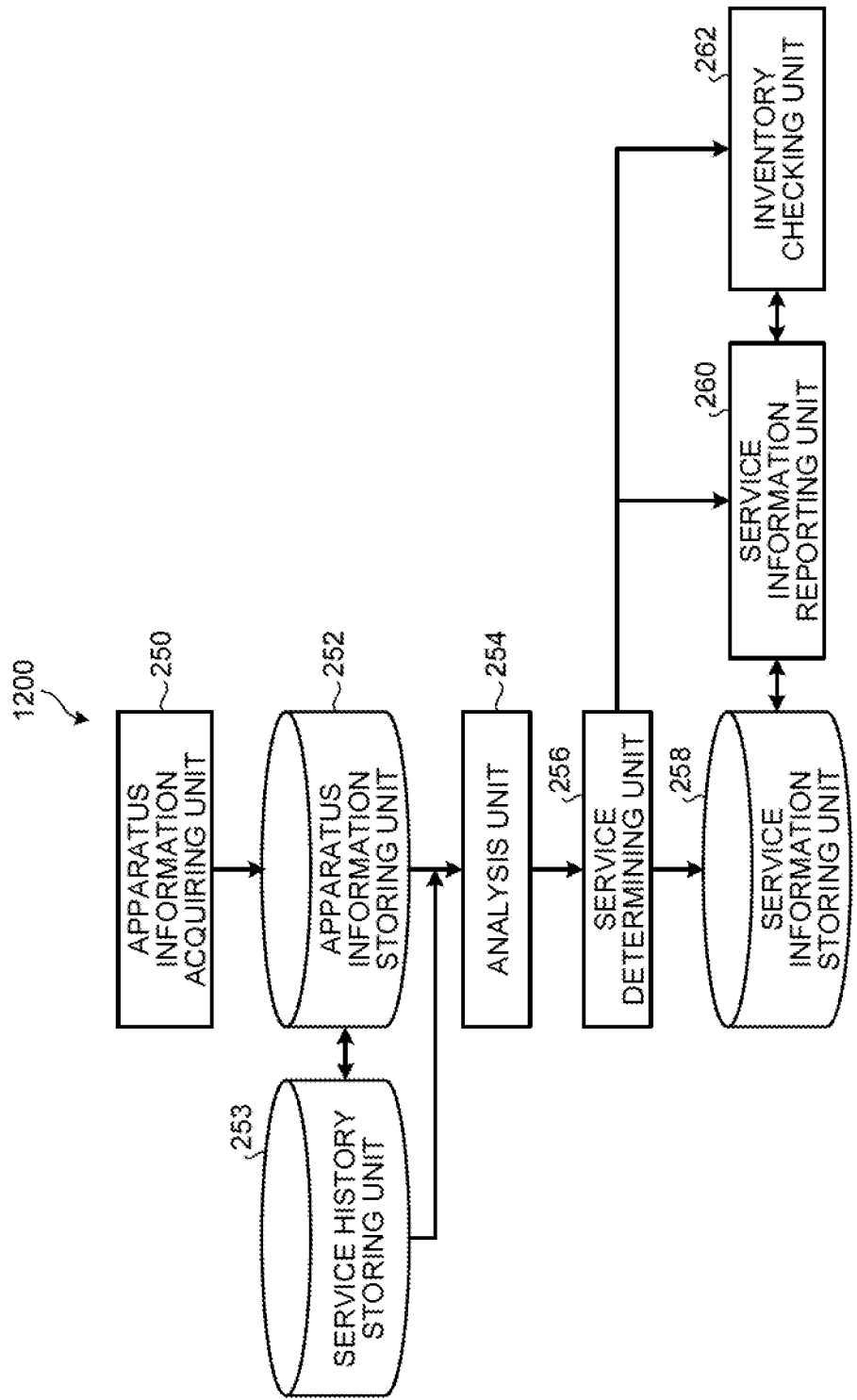
FIG. 17 is a block diagram illustrating an exemplary functional structure of a center system in the second embodiment.

FIG. 17 is a block diagram illustrating an exemplary functional structure of the center system 1200 in the second embodiment. As illustrated in FIG. 17, the center system 1200 is different from the first embodiment in further including an inventory checking unit 262. The inventory checking unit 262 can be implemented by, for example, the control device 202 and the storage device 204.

When a result of the analysis on an analysis item from the analysis unit 254 satisfies the first condition or the second condition, the inventory checking unit 262 checks with the inventory management system 1400 whether a replacement part needed for maintenance related to the analysis item is in stock. If the replacement part is not in stock, the inventory checking unit 262 instructs the inventory management system 1400 to place an order for the replacement part.

Figure 18:
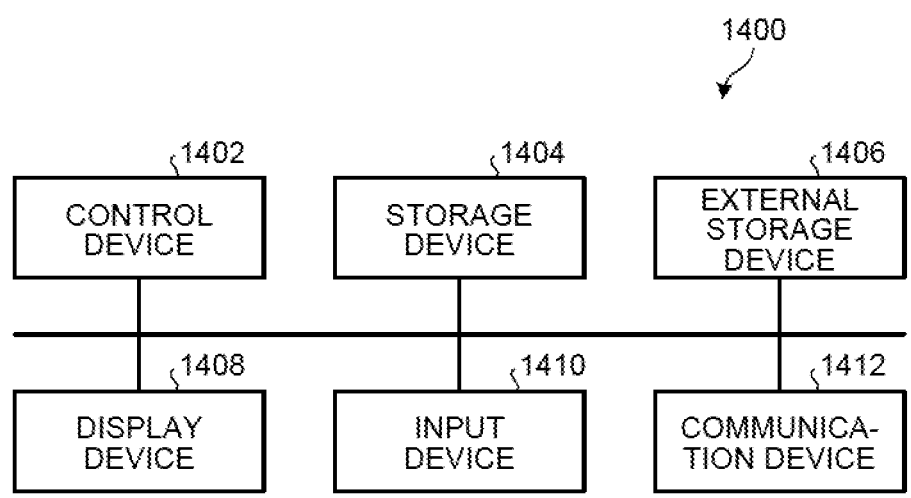
FIG. 18 is a block diagram illustrating an exemplary hardware structure of an inventory management system in the second embodiment.

FIG. 18 is a block diagram illustrating an exemplary hardware structure of the inventory management system 1400 in the second embodiment. The inventory management system 1400 includes a control device 1402 such as a CPU and a GPU, a storage device 1404 such as a ROM and a RAM, an external storage device 1406 such as an HDD or an SSD, a display device 1408 such as a display, an input device 1410 such as a keyboard and a mouse, and a communication device 1412 such as a communication interface, thus having a hardware structure utilizing a usual computer.

Figure 19:
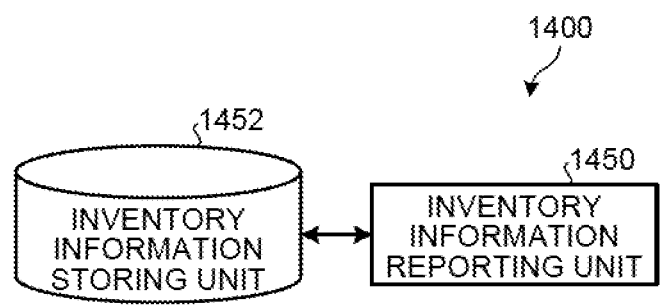
FIG. 19 is a block diagram illustrating an exemplary functional structure of the inventory management system in the second embodiment.

FIG. 19 is a block diagram illustrating an exemplary functional structure of the inventory management system 1400 in the second embodiment. As illustrated in FIG. 19, the inventory management system 1400 includes an inventory information reporting unit 1450 and an inventory information storing unit 1452.

The inventory information reporting unit 1450 can be implemented by, for example, a control device 1402 and a storage device 1404, and the inventory information storing unit 1452 can be implemented by, for example, at least one of the storage device 1404 and an external storage device 1406.

Upon being requested by the center system 1200 to check the inventory status of a replacement part the inventory status of which is to be checked, the inventory information reporting unit 1450 refers to the inventory information storing unit 1452 in which the inventory quantity of each kind of replacement parts is stored, thus reporting to the center system 1200 whether the replacement part is in stock.

Upon being instructed by the center system 1200 to place an order for a replacement part, the inventory information reporting unit 1450 places an order for the replacement part with a manufacturer.

FIG. 20 is a sequence diagram illustrating exemplary processing that is performed by the system 1001 in the second embodiment.

Processes at Steps S200 to S212 are the same as the processes at Steps S100 to S112 in the sequence diagram illustrated in FIG. 15.

Subsequently, when a result of the analysis on an analysis item from the analysis unit 254 satisfies the first condition or the second condition, the inventory checking unit 262 in the center system 1200 checks with the inventory management system 1400 whether a replacement part needed for maintenance related to the analysis item is in stock (Step S214).

Subsequently, the inventory information reporting unit 1450 in the inventory management system 1400 refers to the inventory information storing unit 1452, and reports to the center system 1200 whether the replacement part is in stock (Step S216).

Subsequently, if a replacement part is not in stock as a result of the checking, the inventory checking unit 262 instructs the inventory management system 1400 to place an order for the replacement part (Step S218), and the inventory information reporting unit 1450 places an order for the replacement part with the manufacturer thereof.

Processes at Steps S220 to S226 are the same as the processes at Steps S114 to S120 in the sequence diagram illustrated in FIG. 15.

As described above, according to the second embodiment, a replacement part needed for maintenance work is automatically ordered when the replacement part is not in stock. The second embodiment thus enables reduction in lead time for maintenance.

Modification Examples

Optionally, the embodiments may be modified so that revenue can be earned from allowing a company offering the apparatuses 100 to use the system. In this case, each of the center systems 200 and the center system 1200 may further include a calculation unit that calculates usage fees. This calculation unit can be implemented by, for example, the control device 202 and the storage device 204. The calculation unit that calculates usage fees may be included not in each of the center systems 200 and 1200 but in another computer connected to each of the center systems 200 and 1200.

In this case, the calculation unit may calculate a usage fee for the system on the basis of, for example, the number of people using the system (such as the number of customer engineers, the number of accounts, or the number of terminals to be connected). For example, it is recommended that the usage fee is calculated as XX yen for each account or XX yen for each 100 licenses. Optionally, the calculation unit may calculate the usage fee on the basis of the number of apparatuses 100 under management (for example, XX yen for each 100 apparatuses under management). Further optionally, the calculation unit may calculate the usage fee on the basis of a service determined to be provided, and may calculate the usage fee on the basis of reporting from the service information reporting unit 260. This means, for example, that the usage fee is calculated on the basis of: the number of times services have been determined to be provided; the number of times services have been reported to customer engineers; and contents of services determined to be provided (for example, XX yen for each time or XX yen for each 100 times; and/or XX yen each time a first service is determined and XX yen each time a second service is determined).

Displaying a service on a terminal is exemplified in the above-described embodiments as a method for reporting the service, but this example is not limiting. Alternatively, the service may be output by printing. In this case, the calculation unit may calculate the usage fee on the basis of the number of times services have been output by printing. Further optionally, the calculation unit may calculate the usage fee on the basis of the number of accesses to the system (such as the number of times information has been browsed or the number of clicks performed on a display screen) or the volume of communication with the system (the amount of data browsed by customer engineers). Further optionally, the calculation unit may calculate the usage fee on the basis of the difference between the number of visits that would have been made by customer engineers if no system were used and the number of visits actually made by customer engineers with the present system.

The usage fee is expressed as an amount of cash currency (which is yen in this example but may be dollars, for example). However, the form in which the usage fee is expressed is not limited thereto, and may be an amount of electronic money (such as, for example, Edy (trademark)) for making payments by using electronic data instead of cash currency; an amount of virtual currency (such as, for example, Bitcoin (trademark)) for investing electronic data with the data functioning as currency; or points earned for purchases of merchandise or services (such as, for example, T-POINT (trademark) or Mileage (trademark)).

Computer Program

A computer program to be executed by each of the devices or the systems in the above embodiments may be stored and provided as a file of an installable format or executable format in a computer-readable storage medium. Examples of the storage medium include a compact disc read-only memory (CD-ROM), a compact disc-recordable (CD-R), a memory card, a digital versatile disc (DVD), or a flexible disk (FD).

Optionally, a computer program to be executed by each of the devices or systems in the above embodiments may be stored in a computer connected to a network such as the Internet, and be provided when downloaded via the network. Optionally, a computer program to be executed by each of the devices or systems in the above embodiments may be provided or distributed via a network such as the Internet. Further optionally, a computer program to be executed by each of the devices or systems in the above embodiments may be contained in, for example, a ROM in advance to be provided.

Computer programs to be executed by the devices or systems in the above embodiments are structured as modules for implementing the above-described respective units on a computer. The practical hardware is structured so that the above-described respective functional units can be implemented on a computer when the CPU reads out a computer program from a ROM onto a RAM and executes the computer program.

An embodiment provides an advantageous effect that the efficiency of maintenance work can be enhanced while effectively utilizing results of analyses on information acquired from an apparatus.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A system to perform a service determination method for determining one or more services to be performed to maintain an image-forming apparatus, the one or more services including anterior maintenance for a predicted failure, posterior maintenance for an already-occurred failure, preventive maintenance according to a preventive maintenance plan, and regular maintenance on a regular or prescheduled basis, and maintaining, in a memory, service information indicating the one or more services to be performed, the system comprising:

processing circuitry configured to, by executing one or more programs,
(a) electronically receive, from a specified image-forming apparatus over a network, apparatus information regarding the image-forming apparatus, the received apparatus information including identification information identifying the image forming apparatus and state information regarding a current state of the image-forming apparatus, the state information being derived from information obtained from sensors of the image forming apparatus;
(b) perform an analysis of one or more analysis items relating to a predicted failure of the image-forming apparatus, based on the apparatus information and service history information indicating a customer maintenance request history, acquired from the memory, including calculating a probability associated with receiving a maintenance request regarding the predicted failure of the image-forming apparatus within a predetermined time period from a customer;
(b1) when determining based on an analysis result, that a first condition for performing a first maintenance work within the predetermined time period is satisfied, the first condition being that the calculated probability associated with receiving a maintenance request regarding the predicted failure is higher than a first probability threshold associated with the service history information, modify, in the memory, said service information to indicate that said first maintenance work is to be performed within the predetermined time period;
(c) when determining, based on the analysis result, that a second condition is satisfied, the second condition being that the calculated probability associated with receiving a maintenance request regarding the predicted failure occurring within the predetermined time period is higher than a second probability threshold determined based on the service history information, modify, in the memory, said service information to specify that said first maintenance work is to be performed when a next earliest other maintenance work, amongst the anterior maintenance, the posterior maintenance, the preventive maintenance, and the regular maintenance, is to be performed within the predetermined time period, the second probability threshold being lower than the first probability threshold;
(d) when the service information is modified, automatically transmit, over the network, the modified service information to a predetermined address associated with a terminal so that the modified service information is displayed on the terminal;
when it is determined in (b1) that the first condition is satisfied, determine whether a part used for the first maintenance work within the predetermined time period is in stock based on inventory information of the part, and when the part is not in stock, automatically transmit an order for the part to a manufacturer of the part; and when it is determined in (c) that the second condition is satisfied, determine whether a part used for the first maintenance work or the other maintenance work is in stock based on the inventory information of the part, and when the part is not in stock, automatically transmit an order for the part to a manufacturer of the part.

2. The system according to claim 1, wherein the processing circuitry is further configured to acquire a first pattern of the apparatus information and a second pattern different from the first pattern;

compare the first pattern with the apparatus information acquired within a fixed period, and when matching with the first pattern, determine that the first maintenance work is to be performed within the predetermined time period; and compare the second pattern with the apparatus information acquired within the fixed period, and when matching with the second pattern, determine that the first maintenance work is to be performed when the next earliest other maintenance work is to be performed.

3. The system according to claim 1, wherein the processing circuitry is further configured to (d1) acquire the first conditions that are different between a plurality of apparatuses, and the second conditions that are different between the plurality of apparatuses;

(d2) determine whether apparatus information acquired from one apparatus of the plurality of apparatuses satisfies the first condition corresponding to the one apparatus;

(d3) determine whether apparatus information acquired from the one apparatus satisfies the second condition corresponding to the one apparatus;

(d4) when it is determined in (d2) that the first condition is satisfied, provide notice that the first maintenance work is to be performed within the predetermined time period for the one apparatus; and (d5) when it is determined in (d3) that the second condition is satisfied, provide notice that the second maintenance work is to be performed together with the other maintenance work performed within the predetermined time period for the one apparatus.

4. The system according to claim 1, wherein the processing circuitry is further configured to when it is determined in (b1) that the first condition is satisfied, provide notice that the first maintenance work is to be performed within the predetermined time period, by displaying a first indication on the terminal; and when it is determined in (c) that the second condition is satisfied, provide notice that the first maintenance work is to be performed together with the other maintenance work performed within the predetermined time period, by displaying a second indication on the terminal.

5. The system according to claim 1, wherein the processing circuitry is further configured to when it is determined in (b1) that the first condition is satisfied, provide notice that the first maintenance work is to be performed within the predetermined time period, by printing from a printing machine connected to the system; and when it is determined in (c) that the second condition is satisfied, provide notice that the second maintenance work is to be performed together with the other maintenance work performed within the predetermined time period, by printing from a printing machine connected to the system.

6. The system according to claim 5, wherein the processing circuitry is further configured to determine a usage fee for the notice.

7. The system according to claim 1, wherein the first condition determined by the processing circuitry indicates that failure of the apparatus will occur with a predetermined probability when the first condition is satisfied, and the second condition indicates that failure of the apparatus will occur with a predetermined probability when the second condition is satisfied, and the probability that the failure will occur when the first condition is satisfied is higher than the probability that the failure will occur when the second condition is satisfied.

8. The system according to claim 1, wherein the first condition determined by the processing circuitry indicates that failure of the apparatus will occur within the predetermined time period when the first condition is satisfied, and the second condition indicates that failure of the apparatus will occur within the predetermined time period when the second condition is satisfied, and the period within which the failure will occur when the first condition is satisfied is shorter than the period within which the failure will occur when the second condition is satisfied.

9. The system according to claim 1, wherein the first condition determined by the processing circuitry indicates that a maintenance request will be received from a user of the apparatus with a predetermined probability when the first condition is satisfied, and the second condition indicate that a maintenance request will be received from the user of the apparatus with a predetermined probability when the second condition is satisfied.

10. The system according to claim 1, wherein the processing circuitry is further configured to when determining, based on the comparison, that the calculated probability associated with receiving a maintenance request regarding the predicted failure is not higher than the second probability threshold determined based on the service history information, modify said service information to specify that said first maintenance work is to be performed as preventive maintenance.

11. The system according to claim 1, wherein the probability calculated by the processing circuitry is associated with receiving a maintenance request regarding the predicted failure is associated with an urgency to attend to the predicted failure of the apparatus, associated with the image-forming apparatus information.

12. The system of claim 1, wherein the processing circuitry is further configured to perform the analysis of the one or more analysis items, which includes an item related to a failure of the image forming apparatus and an item related to an expendable component of the image forming apparatus.

13. A service determination method performed by a computer that is in a system connected to a network and that is configured by execution of one or more programs of executable instructions, for determining one or more services to be performed to maintain an image-forming apparatus, the one or more services including anterior maintenance for a predicted failure, posterior maintenance for an already-occurred failure, preventive maintenance according to a preventive maintenance plan, and regular maintenance on a regular or prescheduled basis, and maintaining, in a memory, service information indicating the one or more services to be performed, the service determination method comprising:

electronically receiving, from a specified image-forming apparatus over the network, apparatus information regarding the image-forming apparatus, the received apparatus information including identification information identifying the image-forming apparatus and state information regarding a current state of the image-forming apparatus, the state information being derived from information obtained from sensors of the image forming apparatus;

performing, based on the program execution, an analysis of one or more analysis items relating to a predicted failure of the image-forming apparatus, based on the apparatus information and service history information indicating a customer maintenance request history, acquired from the memory, including calculating a probability associated with receiving a maintenance request regarding the predicted failure of the image-forming apparatus within a predetermined time period from a customer;

when determining, based on an analysis result, that a first condition for performing a first maintenance work within the predetermined time period is satisfied, the first condition being that the calculated probability associated with receiving a maintenance request regarding the predicted failure is higher than a first probability threshold associated with the service history information, modifying, in the memory, said service information to indicate that said first maintenance work is to be performed within the predetermined time period; and when determining, based on the analysis result, that a second condition is satisfied, the second condition being that the calculated probability associated with receiving a maintenance request regarding the predicted failure occurring within the predetermined time period is higher than a second probability threshold determined based on the service history information, modifying, in the memory, said service information to specify that said first maintenance work is to be performed when a next earliest other maintenance work, amongst the anterior maintenance, the posterior maintenance, the preventive maintenance and the regular maintenance, is to be performed within the predetermined time period, the second probability threshold being lower than the first probability threshold;

when the service information is modified, automatically transmitting, over the network, the modified service information to a predetermined address associated with a terminal so that the modified service information is displayed on the terminal;

when it is determined that the first condition is satisfied, determining whether a part used for the first maintenance work within the predetermined time period is in stock based on inventory information of the part, and when the part is not in stock, automatically transmitting an order for the part to a manufacturer of the part; and when it is determined that the second condition is satisfied, determining whether a part used for the first maintenance work or the other maintenance work is in stock based on the inventory information of the part, and when the part is not in stock, automatically transmitting an order for the part to a manufacturer of the part.

14. A computer program product including instructions embodied in a non-transitory medium and executable by a computer, in a system connected to a network, to perform a service determination method for determining one or more services to be performed to maintain image-forming an apparatus to be serviced, the one or more services including anterior maintenance for a predicted failure, posterior maintenance for an already-occurred failure, preventive maintenance according to a preventive maintenance plan, and regular maintenance on a regular or prescheduled basis, and maintaining, in a memory, service information indicating the one or more services to be performed, the method comprising:

electronically receiving, from a specified image-forming apparatus over the network, apparatus information regarding the image-forming apparatus, the received apparatus information including identification information identifying the image-forming apparatus and state information regarding a current state of the image-forming apparatus, the state information being derived from information obtained from sensors of the image forming apparatus;

performing, based on the program execution, an analysis of one or more analysis items relating to a predicted failure of the image-forming apparatus, based on the apparatus information and service history information indicating a customer maintenance request history, acquired from the memory, including calculating a probability associated with receiving a maintenance request regarding the predicted failure of the image-forming apparatus within a predetermined time period from a customer;

when determining, based on an analysis result, that a first condition for performing a first maintenance work within the predetermined time period is satisfied, the first condition being that the calculated probability associated with receiving a maintenance request regarding the predicted failure is higher than a first probability threshold associated with the service history information, modifying, in the memory, said service information to indicate that said first maintenance work is to be performed within the predetermined time period; and when determining, based on the analysis result, that a second condition is satisfied, the second condition being that the calculated probability associated with receiving a maintenance request regarding the predicted failure occurring within the predetermined time period is higher than a second probability threshold determined based on the service history information, modifying, in the memory, said service information to specify that said first maintenance work is to be performed when a next earliest other maintenance work, amongst the anterior maintenance, the posterior maintenance, the preventive maintenance, and the regular maintenance, is to be performed within the predetermined time period, the second probability threshold being lower than the first probability threshold;

when the service information is modified, automatically transmitting, over the network, the modified service information to a predetermined address associated with a terminal so that the modified service information is displayed on the terminal;

when it is determined that the first condition is satisfied, determining whether a part used for the first maintenance work within the predetermined time period is in stock based on inventory information of the part, and when the part is not in stock, automatically transmitting an order for the part to a manufacturer of the part; and when it is determined that the second condition is satisfied, determining whether a part used for the first maintenance work or the other maintenance work is in stock based on the inventory information of the part, and when the part is not in stock, automatically transmitting an order for the part to a manufacturer of the part.

\* \* \* \* \*